June 4, 1946.    R. BERLINGER    2,401,540
GRAIN CONVEYER
Filed Sept. 5, 1945
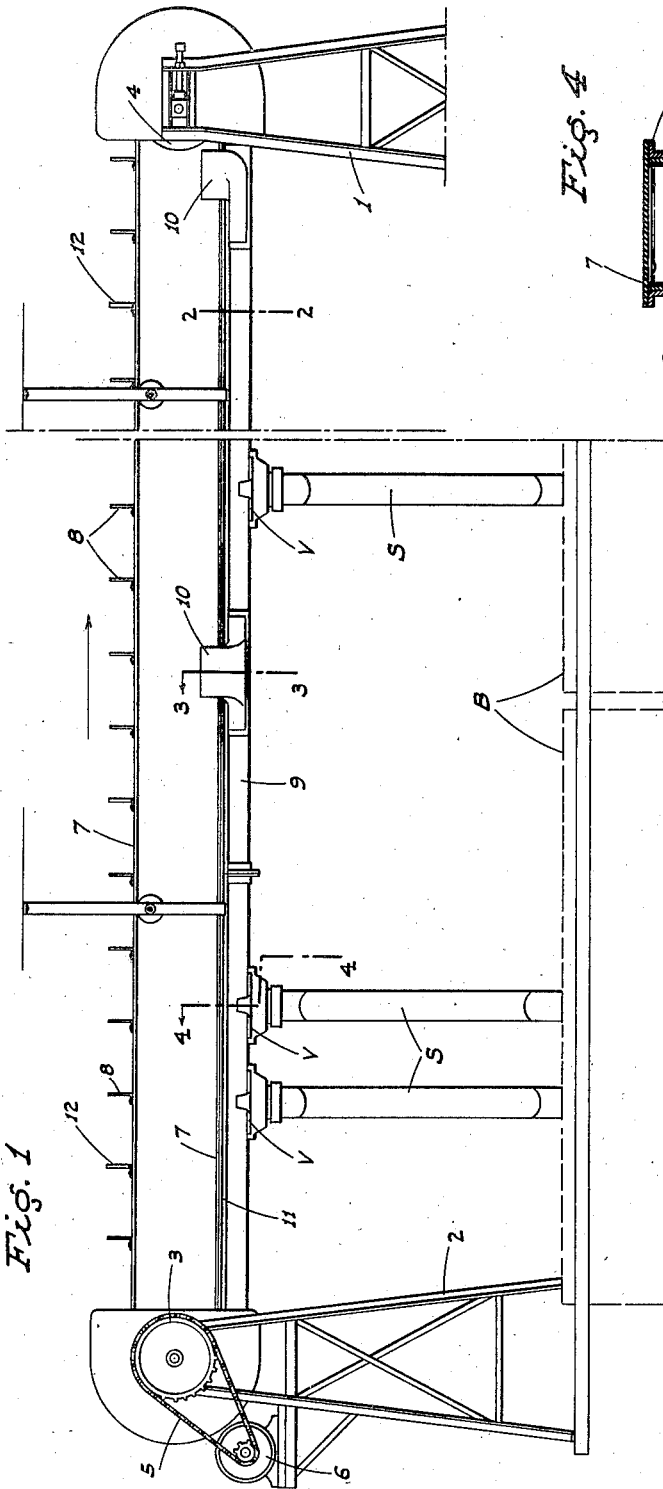
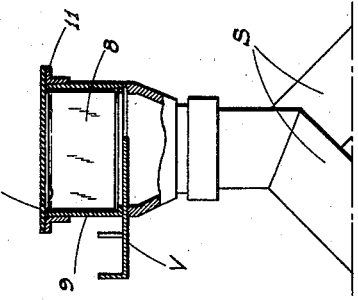
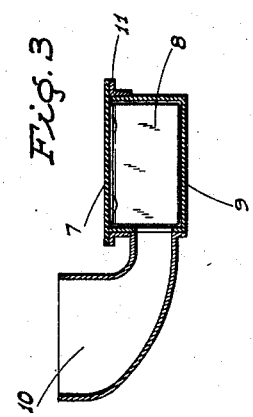
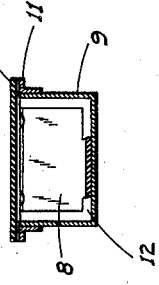
INVENTOR
*Roy Berlinger*
ATTORNEYS Patented June 4, 1946

2,401,540

UNITED STATES PATENT OFFICE 2,401,540

GRAIN CONVEYER

Roy Berlinger, Chico, Calif.

Application September 5, 1945, Serial No. 614,474

6 Claims. (Cl. 198—174)

This invention relates to improvements in the conveying of grains. It is particularly directed towards a conveyer for selectively delivering rice from a source of supply to different storage bins.

In practice rice is harvested into bulk delivery trucks and carried to the storage warehouses. Then, by suitable mechanism, it is elevated to a point above the storage bins and then conveyed and discharged, selectively, into the different bins.

It is the present practice to have this discharging conveyer either a simple auger conveyer or a belt conveyer. These two forms have several disadvantages in that they do not confine the dust, which is quite excessive, particularly with rice, and furthermore they do not, as a rule, ordinarily sweep the conveying means clean of the grain, nor is there a direct and positive delivery action.

It is the primary object of my invention to provide a simple form of enclosed conveyer trough, and through which an endless belt conveyer with conveyer cleats is carried, the belt itself forming a closure for the trough; means being provided whereby any excessive wear on the belt is prevented, and whereby the conveying cleats are held in true and proper alinement in order to maintain a steady stream of the grain through the trough. It is aimed to provide by the combination of these elements a positive delivery for the grain in a confined area so as to prevent substantially all escape of dust.

A further object of this invention is to provide a simple and inexpensive grain conveyer, and yet one which will be exceedingly effective for the purpose for which it is designed.

These objects are accomplished by means of such structure and relative arrangement of parts as will fully appear by a perusal of the following specification and claims.

In the drawing similar characters of reference indicate corresponding parts in the several views:

Figure 1 is a side elevation of my conveyer in its preferred form.

Figure 2 is a cross sectional view taken on line 2—2 of Fig. 1.

Figure 3 is a cross sectional view taken on a line 3—3 of Fig. 1.

Figure 4 is a cross sectional view taken on a line 4—4 of Fig. 1.

Referring now more particularly to the characters of reference on the drawing, my improved conveyer is suitably held above the storage bins B by means of towers 1 and 2 of any suitable construction. At the upper ends of the towers 1 and 2 are journaled suitable driven pulleys 4 and 3, respectively, the pulley 3 being driven by a suitable chain connection 5 from a motor 6, or other desired motive power. About the pulleys 3 and 4 is mounted an endless belt 7 projecting outwardly from the plane of which are conveyer cleats 8 adapted, on their lower runs, to move through a conveyer trough 9 of substantially rectangular form in cross section, which trough is mounted above the bins B, and from which spouts project for discharge into different ones of the bins B, said spouts being in open communication with the trough 9 through the medium of slide control valve V.

The rice or other grain is carried by suitable means from the bulk conveyer trucks or from sacked material upwardly to delivery inlets 10 which open into the trough 9 at intermediate points along its length so that the grain may be continuously discharged into the trough ready to be conveyed therealong to the discharge spouts.

At each upper edge of the trough is provided a laterally projecting flange 11. The width of the belt 7 is such that its lower run projects not only across the open upper end of the trough but also extends over the flanges 11 so that the belt acts as an effective seal for the open side of the trough and prevents the escape of dust therefrom as the grain is being rapidly carried through the trough.

It will be obvious that with the operation of the belt 7 the cleats 8 will engage the grain as it discharges from the inlets 10 and carry it along to the spouts S.

An important element of my invention is the means which I provide to maintain the cleats 8 in proper alinement within the trough 9 and prevent them from sagging, and also to prevent a frictional drag of the belt over the top of the flanges 11 which would result in excessive wear of the belt. This feature comprises a slightly resilient but semi-rigid sealing strip 12 which is engaged about one cleat 8 at predetermined points along the length of the belt 7. These strips are of sufficient width so as to closely and frictionally engage the sides and bottom of the trough 9 and to hold the belt just very slightly out of contact with the flanges 11, but without impairing the sealing action against dust. Also, these strips, by being a relatively tight fit in the groove, maintain the belt from materially sagging at any point intermediate its length, and hence hold the other cleats in alinement within the trough.

From the foregoing description it will be observed that I have provided a conveyer for the purpose noted which is completely enclosed; can be operated in a rapid and effective manner for proper delivery of the grain, and which seals off the objectionable dust which is bound to escape from the rapidly moving grain.

Having thus described the invention, the following is claimed as new and useful and upon which Letters Patent is desired:

1. A conveyer comprising in combination: a trough; a driven endless belt; conveyer cleats projecting outwardly from the outer surface of the belt, the cleats on the lower run of the belt projecting into the trough; the lower run of the belt being wider than the open side of the trough and overhanging the top edges of the trough in close proximity thereto to form a dust sealing closure thereover.

2. A conveyer as in claim 1 in which some of the cleats have an edge lining which frictionally engages the inner sides and bottom of the trough.

3. A conveyer as in claim 1 in which some of the cleats have an edge lining which frictionally engages the inner sides and bottom of the trough; the combined height of the linings and their subjoined cleats being sufficient to maintain the belt out of frictional engagement with the top edges of the trough.

4. A conveyer as in claim 1 in which some of the cleats have an edge lining which frictionally engages the inner sides and bottom of the trough; such linings being of semi-rigid resilient material.

5. A conveyer as in claim 1 in which some of the cleats have an edge lining which frictionally engages the inner sides and bottom of the trough; the combined width of the linings and their subjoined cleats being slightly greater than the width of the balance of the cleats.

6. A conveyer as in claim 1 in which flanges project from the top edges of the trough, the width of the belt being substantially equal to the combined width of the trough and flanges whereby to overlap the latter.

ROY BERLINGER.